March 22, 1927. 1,621,592
C. H. LAND
TRACTOR TRAILER
Original Filed March 12, 1926  4 Sheets-Sheet 1
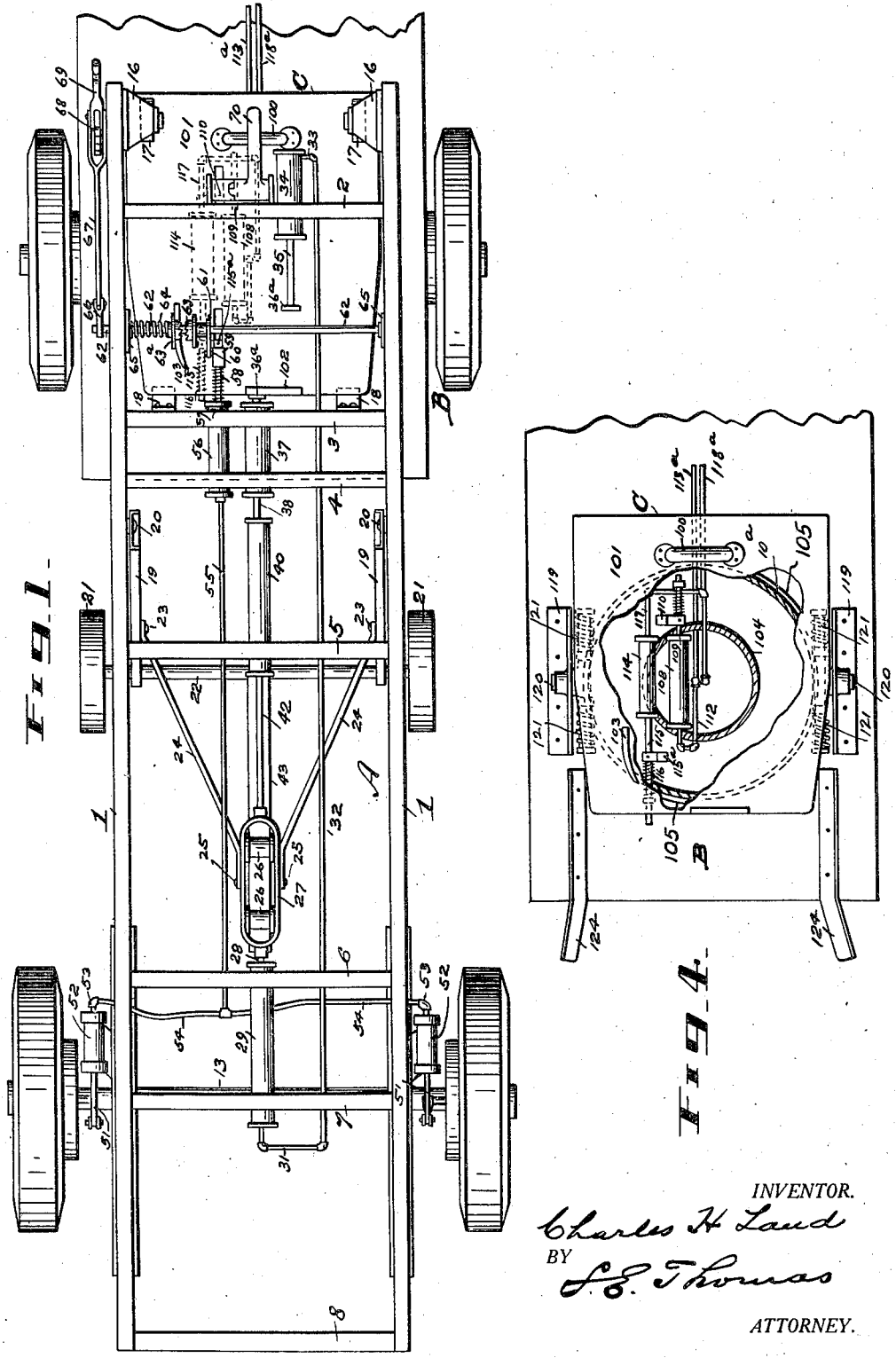
INVENTOR.
Charles H. Land
BY
L. E. Thomas
ATTORNEY.

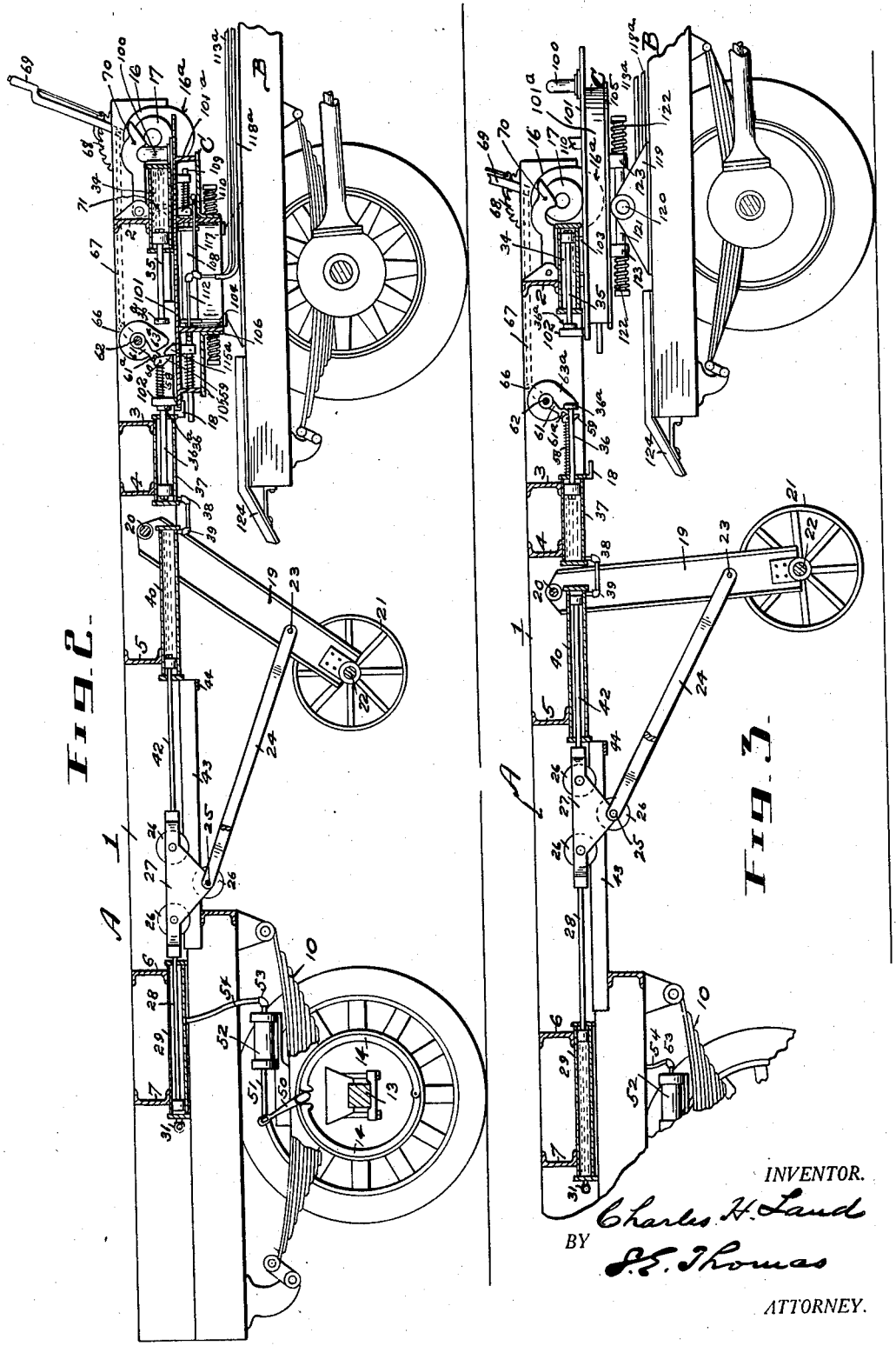

March 22, 1927.

C. H. LAND

TRACTOR TRAILER

Original Filed March 12, 1926

INVENTOR.
Charles H. Land
BY
S. E. Thomas
ATTORNEY.

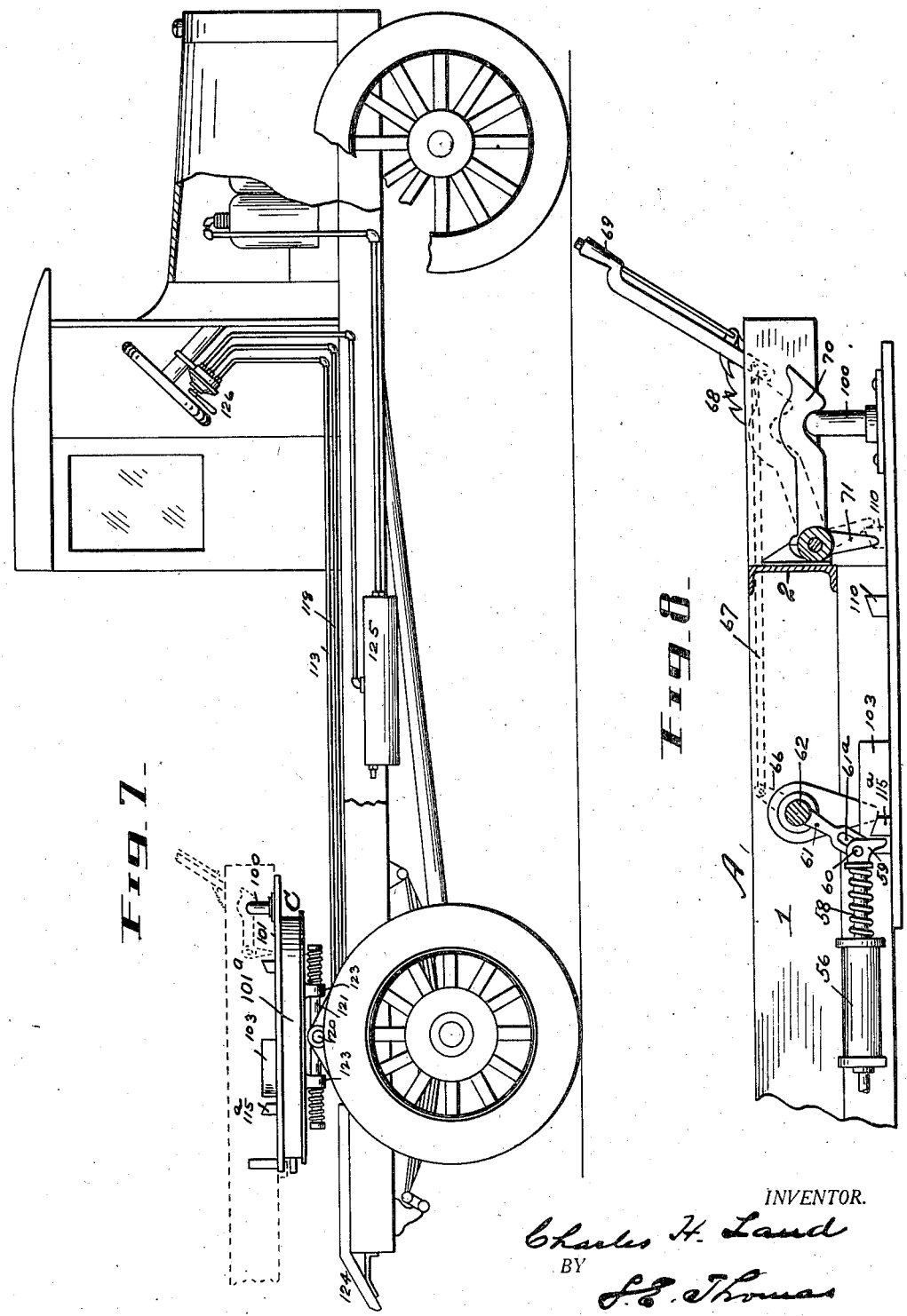

Patented Mar. 22, 1927.

1,621,592

UNITED STATES PATENT OFFICE.

CHARLES H. LAND, OF DETROIT, MICHIGAN.

TRACTOR TRAILER.

Application filed March 12, 1926, Serial No. 94,120. Renewed February 12, 1927.

This invention relates to an improvement in tractor-trailers shown in the accompanying drawings and particularly set forth in the following specification and claims.

This invention relates generally to an improvement in automatic coupling means for trailers and particularly to an improved leg lifting mechanism and lock release mechanism for same.

One object of the invention is to provide a new and positive means for automatically raising and lowering a supporting leg when the trailer and tractor are being coupled or uncoupled.

A further object is to provide for the co-operative relation with the coupling and uncoupling of the tractor to the trailer of a braking device one part of which is carried by the tractor and one part by the trailer.

One of the objects of the present invention is to provide a hydraulic line or system connected with a supporting leg on the trailer with means carried on the tractor to engage mechanism of said line whereby the supporting leg can be thrown into or out of action by the backward or forward movement of the tractor.

Another feature of the invention consists in providing a rolling carriage connected to the supporting leg interposed in a hydraulic line in such a manner that the backward or forward flow of the liquid raises or lowers said leg.

A further object of the invention consists in providing a plurality of cylinders connected by piping in such a manner that the exhaustion of liquid in one cylinder fills the area of the other cylinders with equal volume, but which are of different lengths and diameters so that a relatively small movement of the tractor may be multiplied in lifting the supporting leg.

Another feature of the invention consists in constructing the device that the piston heads of the forward cylinders are so spaced that an actuating lug on the fifth wheel of the tractor will always come between them when coupling the tractor to the trailer.

A further object of the invention is to provide a locking mechanism on the trailer co-ordinating with the fifth wheel on the tractor adapted to permit engagement with air mechanism attached to the upper turn-plate and having a slidable lug which is adapted to engage a trip lever on trailer lock and adapted to be optionally operated to disengage the lock on the trailer.

Co-ordinating with the mechanism for raising and lowering the supporting leg and for locking the tractor to the trailer is a hydraulic brake mechanism that automatically engages or disengages with actuating mechanism on tractor when the tractor and trailer are coupled or uncoupled, also a manually controlled hydraulic brake system on trailer and means on tractor to disengage it from locked position.

The brake mechanism however, while co-ordinating—and for that reason shown— with the mechanism for raising and lowering the supporting leg and other features of the present invention form the subject matter of another application.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a plan view of a trailer showing a fragment of the rear end of a tractor to which it is coupled.

Figure 2 is a longitudinal vertical sectional view through the trailer and the rear end of a tractor to which it is coupled showing the supporting leg of the trailer raised from the ground.

Figure 3 is a similar view with the leg lowered, the coupling hook of the trailer being shown in released relation to the co-operating tractor coupling mechanism.

Figure 4 is a fragmentary plan view of the rear end of the tractor with a portion of the upper turn-plate broken away to disclose the lower locking plate of the turn table and air cylinder for controlling the lock and brake mechanism.

Figure 7 is a side elevation of a tractor with parts broken away and in section showing the air reservoir and leads to the lock releasing cylinder and brake cylinder and air controlling valve.

Figure 8 is a fragmentary longitudinal sectional view of the forward end of the trailer showing the locking hook engaged with the lock bar carried by the upper turn-plate of the fifth wheel;—a fragment of which is shown, and in dotted lines the locking hook released, due to contact with the trip locking lug.

Referring now to the reference numerals placed upon the drawings to indicate the several parts of the apparatus,—in which like characters designate the same parts in the several views:

Figure 5:
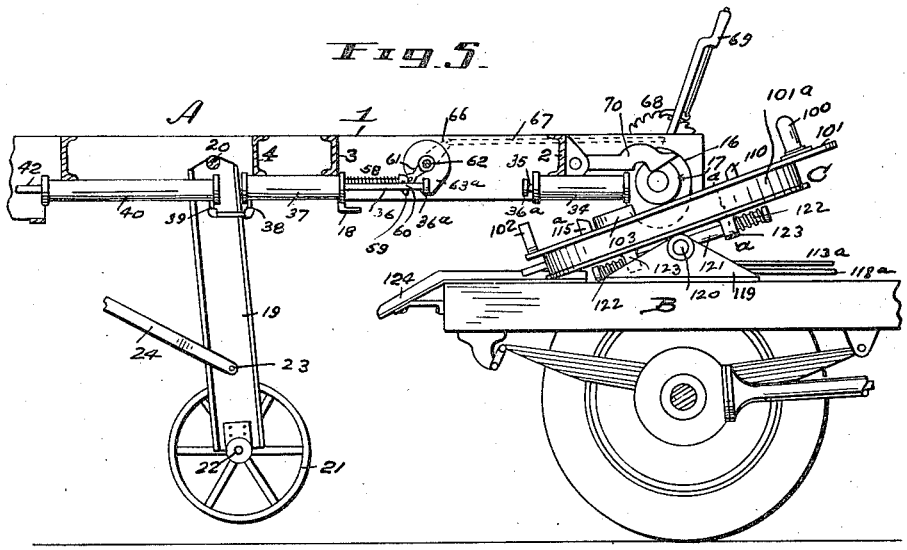
Figure 5 is a fragmentary longitudinal vertical sectional view through the forward end of the trailer and the rear end of the tractor showing the fifth wheel tilted with the locking hook of the trailer in the position it would appear when about to engage or when released from the locking bar of the tractor.
Figure 6:
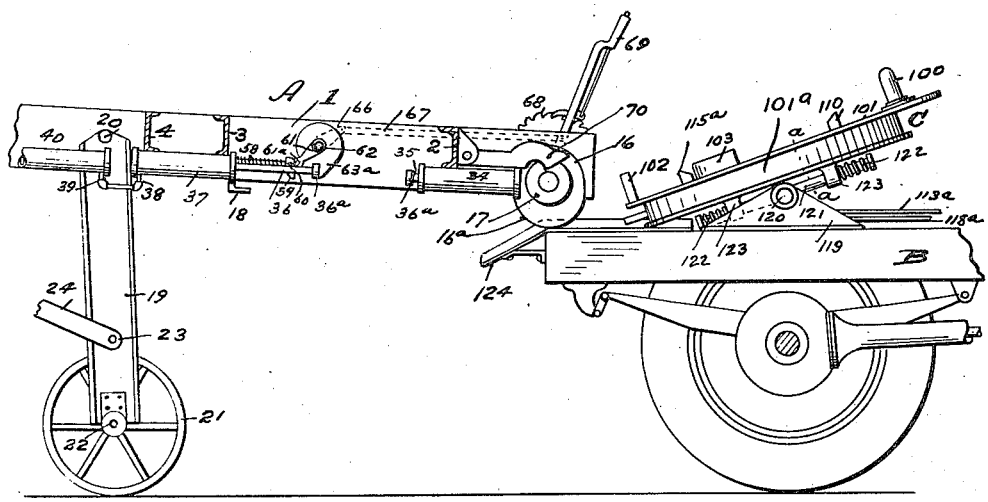
Figure 6 is a similar view showing the forward end of the trailer resting upon its supporting wheel.

The sills 1 of the trailer A are constructed of channel iron with their flanges extending outwardly and are bolted to transverse channel members 2—3—4—5—6—7 and 8 secured to the side sills of the trailer frame. At the forward end of the trailer are brackets 16 including arc-shaped tracking members 16ª and rollers 17 journaled in the brackets. The arc-shaped tracking members 16ª bolted to the frame of the trailer are designed to ride up the inclined tracks or skids 124 of the tractor B upon backing the tractor into the trailer and in doing so the swinging supporting wheels 21 at the forward end of the trailer are lifted from the ground. A further backing movement of the tractor will result in the rollers 17 encountering the inclined upper turn-plate 101 of the fifth wheel C of the tractor—which is normally inclined when the tractor is uncoupled from the trailer—this movement lifts the arc-shaped tracking members 16ª clear of the skids 124 and when the rollers 17 in riding up the inclined turn-plate 101 reach approximately the dotted line a—a, the fifth wheel is forced into a horizontal position. An impact lug 102 extending upwardly from the turn-plate 101 is now brought into position between the cross members 36ª attached to the ends of the respective piston rods 35 and 36. The piston rod of the cylinder 37, due to impact with the lug 102, is thus forced backward and oil contained in the cylinder is discharged through pipe connections 38—39 into the cylinder 40 thereby forcing out its piston rod 42. The piston rod 42 is attached to a roller carriage 27 which is in turn attached to a piston rod 28 projecting from the cylinder 29. The roller carriage 27 is fitted with a plurality of rollers 26 which transverse and are guided by an I-beam 43 mounted at one end upon a cross member of the frame and at the other end supported in a bracket 44 bolted to one of the transverse beams of the trailer frame. The forward movement of the piston rod 42 forces the oil out of the cylinder 29 through the pipe connection 31 and back through the pipe 32 into the cylinder 34 at 33. This action forces out the piston rod 35 into a position ready for a reverse movement. A pair of supporting leg members 19—19 are pivoted at 20 to the side sills of the trailer frame, and journaled in the lower end of the leg members is an axle 22 which at each end carries leg wheels 21—21. Arms 24—24 are pivoted to the supporting leg members at 23 and at 25 to the traveling carriage 27. Thus when the carriage 27 is forced to the limit of its backward movement the supporting wheels 21 of the leg frame are lifted from the ground and are maintained in this position so long as the trailer is coupled to the tractor. When it is desired to uncouple the tractor from the trailer the impact of the lug 102 carried by the turn-plate 101 against the head of the piston rod 35 presses out the fluid from the cylinder 34 thereby reversing the flow and forcing the supporting leg into an operative or downward position.

It will now be noted that by maintaining equal volumes of liquid in each of the cylinders and by providing pistons of different length and diameter, a short or long piston action may be obtained.

It will also be noted that as semi-trailers are often of considerable length, a hydraulic system of this character affords a more positive and practical method than is offered by the usual thrust bars or gearing commonly employed for raising and lowering a trailer supporting leg.

It will now be assumed that the forward end of the trailer is in proper relation to the fifth wheel of the tractor whereby the coupling hook 70 may drop over the coupling bar 100, bolted to the upper turn-plate of the fifth wheel and that the rearward edge of the turn-plate is caused to project into suitable lugs or stop brackets 18, secured to the frame,—thus securing the tilting plate in a horizontal plane with the trailer locked to the tractor.

Before coupling the tractor and trailer together a hand brake is set and when set is maintained in this condition until the coupling operation is completed. The manually operated braking lever 69,—pivoted to a segmental ratchet 68,—when actuated operates a brake rod 67 connected with a brake lever 66 upon the shaft 62, supported in bearing brackets 65 attached to the side sills of the trailer frame. Sleeved upon the shaft 62 is a coil spring 64—one end of which bears against one of the brackets 65 and the other end of the spring against a slidable member provided with a depending arm 63ª of a cooperating ratchet coupler 63. A lever 61 secured to the shaft 62 has an elongated slot 61ª to receive a pawl pin 60, extending transversely through the end of the piston rod 58 projecting from the hydraulic cylinder 56, supported by a bracket 57 bolted to one of the transverse beams connecting the side sills of the trailer.

Immediately before the coupling hook 70 drops into engagement with the lock bar 100, a tripping lug 103 on the fifth wheel forces the depending arm 63ª of the ratchet coupling member 63 out of engagement with its cooperating member 63 thereby separating the ratchet member and releasing the brakes for transit. While the trailer is coupled to the tractor the braking is done from the cab of the tractor by means of a combined air and hydraulic system. A pawl 59 pivoted on the pin 60 at the end of the piston rod 58 in alignment with a slidable lug 115ª is secured to the piston rod 115 of an air brake cylinder 114 attached to the upper turn-plate of the fifth wheel. The slidable lug 115ª projects through a longitudinal slot in the turn-plate and contacts with the pawl 59 when air pressure is admitted to the cylinder 114 to actuate the piston rod of the latter. This action forces the piston into the cylinder 56 compressing the coil spring 58 and forcing the fluid contents through the pipe 55 to branch pipes 54—54. The latter piping is loose and flexible to allow for action of the springs 10 and axle 13 of the trailer. The fluid from the pipes 54—54 flows through the pipe 53 into the cylinders 52—52 forcing out the piston rods 51—51 attached to the brake cam levers 50—50 operating the expanding brakes 14—14 on the rear wheels of the trailer.

Mounted on the tractor and controlled in the cab is a compressed air tank 125 and controlling valve 126 applied to many trucks. Two air leads 113 and 118 respectively extend from the control valve to the air cylinder 108 for tripping the locking hook 70 from the coupling bar 100,—the other lead connects the air brake cylinder 114 controlling the brake mechanism. The air for the brake passes through flexible rubber piping 118ª through pipe 117 to the cylinder 114. It forces out the piston rod 115 to which is secured the lug 115ª projecting upwardly through a slot in the turn-plate 101. This lug contacts with the pawl 59 of the hydraulic system. A coil spring 116 on the piston rod 115 bearing at one end against the annular wall of the upper turn plate of the fifth wheel and at the other against lug 115ª serves to return the piston to its initial position following the operation.

To uncouple the trailer the operator releases the air into the flexible rubber tubing 113ª, that it may flow through the pipe 112 into the cylinder 108 forcing out the piston 109 to which is secured an off-set lug 110 projecting through an elongated slot in the turn-plate 101. This lug—when the tractor and trailer are coupled together—is in a co-operating position with the trip lever 71 of the trailer. The action of the lug 110 serves to trip the lever 71 raising the coupling hook 70 from engagement with the coupling bar 100. The tractor may now be pulled away from the trailer that the leg may return to a supporting position before the wheel tilts to release the lug 102 from contact with the cross member 36 on the piston rod 35.

The upper turn-plate 101 of the fifth wheel is provided on its under side with an annular depending post 104 journaled in an annular collar 106 integral with the lower rocking plate 105. The upper turn-plate 101 has an annular depending rim 101ª adapted to support the turn-plate in spaced relation to the floor of the rocking plate 105 providing a chamber in which the respective air cylinders 108 and 114 are housed. The lower rocking plate 105 of the fifth wheel is provided with a pair of spaced bearing lugs 123 integral with the plate adapted to support a pair of draft spring shafts 121 projecting in opposite directions from a central hub secured to trunnions 120, journaled in supporting brackets 119,—bolted to the frame of the tractor. Springs 122 are sleeved on the ends of each of the shafts 121,—one end of each spring bearing against the lugs 123, the other end against a collar secured to each end of the shafts.

Having indicated the several parts by reference numerals the construction and operation of the device will be readily understood.

To couple the tractor to the trailer the tractor is backed in as straight a line as possible into the trailer. The arc-shaped tracking members 16ª upon contact with the mounting skids 124 lift the front end of the trailer and the supporting wheels 21. On continuing the backing rollers 17 encounter the initially inclined plate 101 lifting the tracking members 16ª clear of the skids. When the rollers pass approximately to the position indicated by a line a—a (see Figure 5) the fifth wheel is forced into a horizontal position. A lug 102 on the fifth wheel—when the latter tilts—then enters between the ends of the piston rods 35—36 and upon contacting with the end of the piston rod 36, the backing continues. The piston of cylinder 37 is thus forced backward and the oil discharged through pipes 38 and 39 into cylinder 40 thereby pushing out the piston rod 42. As the piston rod 42 is attached to the roller carriage 27 which in turn is also attached to the piston rod 28, the oil is forced out of the cylinder 29 at 31 and flows back through the pipe 32 into cylinders 34 and 33. This forces out the piston 35 into a position ready to reverse the action. The leg arms 24—24 connecting the carriage 27 and the supporting members 21 of the leg frame thus raise the supporting wheels from the ground and they remain in this position as long as the trailer is coupled to the tractor. When the tractor is uncoupled from the trailer the lug 102 impacts on the end of piston rod 35 and presses out the fluid from cylinder 24, thus reversing the flow and forcing the supporting wheels again into an operative position.

As previously indicated, by maintaining equal volumes of liquid in each cylinder and by changing the length and diameter of the same a short or long piston action can be obtained. Attention is now directed to the fact that semi-trailers are often of considerable length. A hydraulic system therefor offers a more positive and practical method than thrust bars or other gearing commonly employed for raising and lowering the supporting leg. The hook bar 70 having dropped over the coupling bar 100, bolted to the upper plate of the fifth wheel, the trailer is now locked to the tractor.

A hand brake is first set before coupling the tractor to the trailer, by a backward movement of the lever 69 and this braking condition is maintained until the coupling is about to be completed. Immediately before the hook 70 drops into position to engage the coupling lock bar the lug 103 on the fifth wheel forces the arm 63ª of the shaft coupling and separates the plates 63—63ª. This action releases the brakes for transit. When coupled the braking is done from the cab of the tractor by means of a combined air and hydraulic system. The pawl 59 being in alignment with the lug 115ª of the fifth wheel contacts with it when air pressure actuates piston rod 115. This action forces the piston into the cylinder 56 compressing the coil spring 58 and forcing the fluid contents through pipe 55 to branch pipes 54—54. The fluid flows into the cylinders 52—52 forcing out the piston rods 51—51 attached to the cam levers 50—50 completing the braking action. The compressed air controlling valve 126 in the cab of the tractor with two leads connecting the compression tank 125 with the two cylinders 108 and 114, supported between the upper and lower plates of the fifth wheel, have been previously described and therefore require no further description at this point.

Having thus described my invention what I claim is:

1. In combination with a tractor and trailer: a plurality of cylinders carried by the trailer; a supporting leg for the trailer; mechanism for automatically operating said supporting leg interposed between the pistons of two of said cylinders and adapted to co-operate therewith, co-ordinating means carried by the tractor adapted upon either backing the tractor or on driving it in a forward direction to alternately and automatically actuate said leg operating mechanism, whereby the leg may be shifted to either a supporting or non-supporting position.

2. In combination with a tractor and trailer; means for automatically coupling and uncoupling the tractor to the trailer; means for manually braking the trailer prior to the coupling operation; a plurality of cylinders; a movable supporting leg for the trailer; mechanism for automatically operating said supporting leg interposed between the pistons of two of said cylinders and adapted to co-operate therewith, co-ordinating means carried by the tractor adapted upon backing the tractor or driving it in a forward direction to alternately and automatically actuate said leg operating mechanism into or out of position to support the forward end of the tractor.

3. In combination with a tractor and trailer; a plurality of hydraulic cylinders carried by the trailer; a supporting leg carried by the frame of the trailer; means connecting the pistons of said cylinders with the supporting leg to raise and lower the latter; a pipe connection between the cylinders, whereby the fluid contained in the cylinders may be made to flow in either direction alternately to actuate the pistons to either raise or lower said supporting leg; and means carried by the tractor adapted to alternately engage the opposing piston rods of two of the cylinders, whereby a backing and hauling movement of the tractor will alternately raise and lower the supporting leg.

4. In combination with a tractor and trailer; a plurality of hydraulic cylinders connected together, whereby liquid may exhaust from one cylinder into other cylinders, said cylinders being of equal volume but of different lengths and diameters, whereby the fluid contained in one cylinder when displaced may fill the other cylinders at relatively different speeds; a supporting leg; means connecting the supporting leg with the piston rods of one pair of cylinders; means carried by the tractor adapted to engage the piston rod of one cylinder to force the fluid through the cylinders in one direction, whereby the leg may be shifted from its trailer supporting position; and means carried by the tractor adapted to engage the piston rod of another cylinder, whereby the fluid may be forced through the cylinders in an opposite direction to actuate the leg mechanism, whereby the leg may support the trailer.

5. In combination with a tractor and trailer; a plurality of hydraulic cylinders connected together, whereby liquid may exhaust from one cylinder into other cylinders, said cylinders being of equal volume but of different lengths and diameters, whereby the fluid contained in one cylinder when displaced may fill the other cylinders at relatively different speeds; a swinging supporting leg pivoted to the trailer and connected with the piston rods of one pair of cylinders; means carried by the tractor adapted to engage the piston rod of one cylinder to force the fluid through the cylinders in one direction, whereby the swinging leg may be raised; and means carried by the tractor adapted to engage the piston rod of another cylinder, whereby the fluid may be forced through the cylinders in an opposite direction to lower said supporting leg respectively upon alternately backing the tractor or driving it in a forward direction.

6. In combination with a tractor and trailer; a tilting fifth wheel carried by the tractor; a plurality of hydraulic cylinders carried by the trailer; a travelling carriage aligned with and connected to the piston rods of two of said cylinders; a rail bolted to the frame of the trailer to guide and support the travelling carriage; a swinging supporting leg for the trailer pivoted to the frame of the latter; arms pivoted to the supporting leg and to the travelling carriage; a pipe connection between the cylinders, whereby fluid contained in the cylinders may flow alternately in opposite directions between cylinders,—one pair of said cylinders having opposed piston rods spaced apart; and an abutment carried by the fifth wheel adapted when the latter is tilted to swing between the ends of said opposed piston rods, whereby it may alternately act upon the latter to raise or lower the supporting leg when the tractor is backed or driven in a forward direction.

7. In combination with a tractor and trailer; a tilting fifth wheel carried by the tractor; a plurality of hydraulic cylinders carried by the trailer; a travelling carriage in alignment and connected with the piston rods of two of said cylinders; a rail bolted to the frame of the trailer to guide and support the travelling carriage; a swinging supporting leg for the trailer pivoted to the frame of the latter; arms pivoted to the supporting leg and to the travelling carriage; a pipe connection between the cylinders, whereby fluid contained in the cylinders may flow in alternate directions between said cylinders,—one pair of said cylinders having opposed piston rods spaced apart; an abutment carried by the fifth wheel adapted when the latter is tilted to swing between the ends of said opposed piston rods; means carried by the trailer for braking the rear wheels of the trailer prior to coupling the tractor to the trailer; means carried by the trailer for coupling the tractor to the trailer; and means for locking and releasing the coupling means.

8. In combination with a tractor and trailer; a tilting fifth wheel carried by the tractor; a plurality of hydraulic cylinders carried by the trailer; a travelling carriage in alignment and connected with the piston rods of two of said cylinders; a rail bolted to the frame of the trailer to guide and support the travelling carriage; a swinging supporting leg for the trailer pivoted to the frame of the latter; arms pivoted to the supporting leg and to the travelling carriage; a pipe connection between the cylinders, whereby fluid contained in the cylinders may flow alternately in opposite directions between cylinders,—one pair of cylinders having opposed piston rods spaced apart; an abutment carried by the fifth wheel adapted when the latter is tilted to swing between the ends of said opposed piston rods; manually operated means carried by the trailer for braking the rear wheels of the latter prior to coupling the tractor to the trailer; means for coupling the tractor to the trailer; means for automatically locking and releasing the coupling means of the trailer from the tractor; means carried by the fifth wheel of the tractor adapted to automatically release the manually operated braking mechanism of the trailer, applied prior to coupling the tractor to the trailer; and means operating from the tractor for applying and releasing the braking mechanism of the trailer while coupled to the tractor.

9. In combination with a tractor and trailer; a plurality of hydraulic cylinders carried by the trailer; a pipe connection between cylinders, whereby the liquid in one cylinder may alternately fill the area of another cylinder to actuate the pistons of the respective cylinders; a swinging supporting leg carried by the trailer; means connecting the swinging leg with the pistons of one pair of cylinders; and means carried by the tractor adapted to engage the piston rods of another pair of cylinders, whereby the fluid in said last named cylinders may be displaced to alternately actuate the pistons connected with the swinging leg upon alternately backing the tractor into the trailer or upon driving the same in a forward direction.

10. In combination with a tractor and trailer; a plurality of hydraulic cylinders carried by the trailer; a pipe connection between the cylinders, whereby liquid in one cylinder may alternately fill the area of another cylinder to actuate the pistons of the cylinders at varying speeds; a supporting leg carried by the trailer; means connecting the supporting leg with the pistons of one pair of cylinders, whereby the supporting leg may be shifted to either a supporting or non-supporting position; means carried by the tractor adapted to engage the piston rods of another pair of cylinders, whereby the fluid in said last named cylinders may be displaced to alternately actuate the pistons connected with the supporting leg upon either backing the tractor into the trailer or driving the same in a forward direction; a hydraulic brake operating mechanism carried by the trailer; means for coupling the tractor to the trailer; an air cylinder carried by the tractor; a compressed air tank; a valve controlling the delivery of air from the compressed air tank to actuate the piston of the air cylinder; and means carried by the piston rod of the air cylinder to engage the piston rod of the hydraulic brake cylinder, whereby the trailer brake mechanism may be actuated.

11. In combination with a tractor and trailer; means for automatically coupling and uncoupling the tractor and trailer; a plurality of hydraulic cylinders carried by the trailer; a supporting leg for the trailer; means for automatically operating said supporting leg interposed between the pistons of two of said cylinders and co-operating therewith; means carried by the tractor adapted when either backing or driving the tractor in a forward direction to respectively actuate said leg operating mechanism either to a trailer supporting or non-supporting position; a compressed air mechanism carried by the tractor, including an air compression tank, an air controlling valve, an air cylinder; and means carried by the piston rod of the air cylinder adapted when actuated to engage the piston rod of the hydraulic brake cylinder, whereby the braking mechanism is actuated.

In testimony whereof, I sign this specification.

CHARLES H. LAND.